(12) United States Patent
Zhang

(10) Patent No.: US 9,480,124 B2
(45) Date of Patent: Oct. 25, 2016

(54) SINGLE STRING OVER POWER PROTECTION AND LIGHT SOURCE DRIVER CIRCUIT USED IN DISPLAY DEVICE

(71) Applicant: SHENZHEN CHINA STAR OPTOELECTRONICS TECHNOLOGY CO., LTD., Shenzhen, Guangdong (CN)

(72) Inventor: Xianming Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 137 days.

(21) Appl. No.: 14/240,379

(22) PCT Filed: Jan. 17, 2014

(86) PCT No.: PCT/CN2014/070752
§ 371 (c)(1),
(2) Date: Jun. 13, 2014

(87) PCT Pub. No.: WO2015/096233
PCT Pub. Date: Jul. 2, 2015

(65) Prior Publication Data
US 2015/0181674 A1 Jun. 25, 2015

(30) Foreign Application Priority Data
Dec. 25, 2013 (CN) .......................... 2013 1 0728360

(51) Int. Cl.
*H05B 33/08* (2006.01)
(52) U.S. Cl.
CPC ........ *H05B 33/0887* (2013.01); *H05B 33/083* (2013.01); *H05B 33/0827* (2013.01); *Y02B 20/341* (2013.01)
(58) Field of Classification Search
CPC .................. H05B 33/0887; H05B 33/083
See application file for complete search history.

(56) References Cited

U.S. PATENT DOCUMENTS

2007/0024213 A1* 2/2007 Shteynberg ........ H05B 33/0815
315/291
2007/0285031 A1* 12/2007 Shteynberg ........... H02M 3/157
315/294
(Continued)

FOREIGN PATENT DOCUMENTS

CN          101489342        7/2009
CN          101833929        9/2010
(Continued)

OTHER PUBLICATIONS

International Search Report dated Sep. 30, 2014.

*Primary Examiner* — Douglas W Owens
*Assistant Examiner* — Pedro C Fernandez
(74) *Attorney, Agent, or Firm* — Stein IP, LLC

(57) ABSTRACT

The present disclosure provides a single-string light bar over power protection device and a light source driver circuit for a display. The over power protection device comprises: a voltage detection unit, with an input terminal being connected to a resistor in the circuit of a single-string light bar at both ends, for obtaining the voltage across the resistor; an integral unit, with an input terminal being connected to the output terminal of the voltage detection unit, for performing an integral transform on the voltage obtained; a comparison unit, which is connected to the output terminal of the integral unit, for comparing the voltage after the integral transform with a reference voltage determined by the system parameters, so as to output an effective over voltage signal when the voltage after the integral transform is higher than the reference voltage; and a latch unit connected to the comparison unit to lock the output standby signal according to the effective over voltage signal. The protection device according to the present disclosure can avoid overheat caused by over current of the single-string light bar, and further refrain from abnormality to the whole backlight module, and thus providing better protection for the LCD display.

18 Claims, 4 Drawing Sheets

(56) References Cited

U.S. PATENT DOCUMENTS

2009/0195163 A1* 8/2009 Nguyen ............ H05B 33/0815
                                                              315/122
2009/0295775 A1   12/2009 Kim et al.
2011/0084620 A1    4/2011 Lee ............................... 315/186

FOREIGN PATENT DOCUMENTS

| CN | 101925230 A | 12/2010 |
| CN | 102143640   |  8/2011 |
| CN | 102435904 A |  5/2012 |
| CN | 103258510 A |  8/2013 |

* cited by examiner

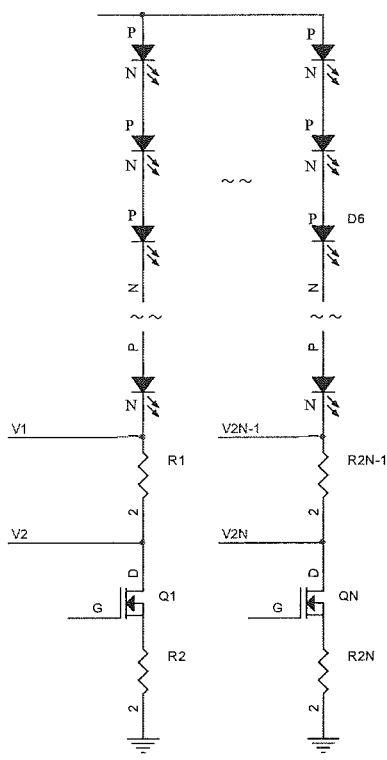
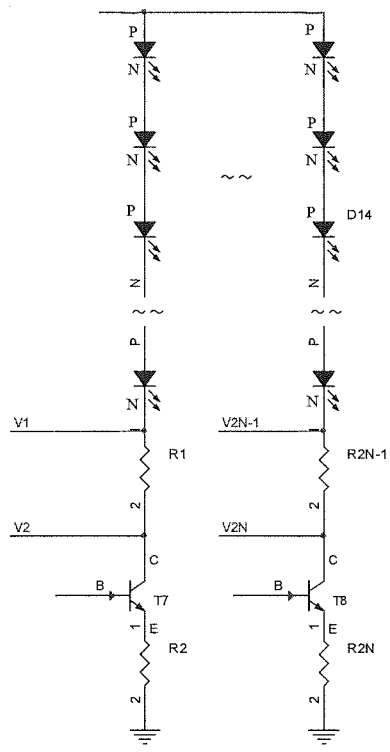
Fig. 1a
(Prior Art)
Fig. 1b
(Prior Art)

SINGLE STRING OVER POWER PROTECTION AND LIGHT SOURCE DRIVER CIRCUIT USED IN DISPLAY DEVICE

FIELD OF THE INVENTION

The present disclosure relates to the technical field of display technology, in particular to a single-string over power protection device and a light source driver circuit for a display.

TECHNICAL BACKGROUND

Light bar is a key component in a backlight module of a liquid crystal display (LCD). Multi-string light bar is the most commonly used in an LCD backlight module at present. A plurality of light emitting diodes (LED) is regularly distributed on the bar base to make up a light bar. The existing light bars are usually symmetrically mounted on both the upper and lower sides or on both the left and right sides of the LCD display, or even on all four sides of the LCD display.

However, in a boost converter of a backlight driver, no over power protection circuit is arranged for each string of light bar. There is merely an over current or over voltage protection circuit for the total input. In this case, a few risks can be posed. As shown in FIGS. 1a and 1b, if breakdown occurs to a MOSFET (FIG. 1a) or a BJT (FIG. 1b), the current through the light bar will be out of control, leading to overly large current through the damaged string. Meanwhile, since the currents in present settings are slightly larger than the normal operating current, thus, abnormality to only one string will lead to failure of detecting the above mentioned problem.

In addition, the over power in the string of light bar can result in a variety of problems, such as over brightness in this area, over temperature of the light bar, and burnout of the LCD diaphragm, etc.

Therefore, it is necessary to design a suitable over power protection for the circuit of each string of light emitting diodes.

SUMMARY OF THE INVENTION

One of the technical problems to be solved by the present disclosure is to provide an device which can protect other components from damage when over current or over voltage occurs in a single-string light bar.

To solve the above technical problem, the present disclosure provides an over power protection device for a single-string of LED light bar. The device comprising:

a voltage detection unit, with an input terminal being connected to a resistor in the circuit of the single-string light bar at both ends, for obtaining the voltage across the resistor;

an integral unit, with an input terminal being connected to the output terminal of the voltage detection unit, for performing an integral transform on the voltage obtained;

a comparison unit, which is connected to the output terminal of the integral unit, for comparing the voltage after the integral transform with a reference voltage determined by the system parameters, so as to output an effective over voltage signal when the voltage after the integral transform is higher than the reference voltage; and a latch unit, connected to the comparison unit to lock the output standby signal according to the effective over voltage signal, wherein during the operating cycle, once the effective over voltage signal appears, the latch unit will keep a standby signal until after experiencing a restart.

According to an embodiment of the present disclosure, the integral unit is a differential input type integral unit, with the other input terminal thereof being connected to an integral reference voltage generation unit to conduct an integral transform on the terminal voltage on the basis of the integral reference voltage. The aforesaid integral reference voltage generation unit includes a proportion amplifier unit for proportionally amplifying the terminal voltage.

According to an embodiment of the present disclosure, a first switch element and a second switch element are further connected to an output terminal of the aforesaid proportion amplifier unit. The first switch element is kept at different on-off state from the second switch element within the same time period.

According to an embodiment of the present disclosure, both the first switch element and the second switch element are MOSFET. Pulse sequences with the same frequency but reversed high-low levels are respectively input to the control terminals of the two switch elements.

According to an embodiment of the present disclosure, the frequency of the pulse sequences is related to the dimming frequency.

According to an embodiment of the present disclosure, the aforesaid latch unit comprises a first and a second transistors, wherein the first transistor is a NPN type transistor and the second transistor is a PNP type transistor, a base of the first transistor is connected to both the output terminal of the comparison unit and the collector of the second transistor. The collector of the first transistor is connected to a base of the second transistor. An emitter of the second transistor is connected to a power Vcc terminal via a pull-up resistor.

According to an embodiment of the present disclosure, the latch unit further comprises a third and a fourth switch elements, wherein a control terminal of the third switch element is connected to the emitter of the second transistor, so as to control on-off of the third switch element by a signal on the emitter of the second transistor. The two output terminals of the third switch element are respectively connected to the ground and the power Vcc terminal, and the control terminal of the fourth switch element is connected to the input terminal of the third switch element which is connected to the power Vcc terminal, and the output terminals of the fourth switch element are respectively connected to an enabled terminal of the boost converter and the ground. The boost converter settles into a standby state when the signal input to the enabled terminal is at low level, and it settles into a normal working state when the signal input to the enabled terminal is at high level.

According to an embodiment of the present disclosure, the aforesaid proportion amplifier unit is configured to double the input terminal voltage.

According to an embodiment of the present disclosure, the frequency of the pulse sequence is equal to the dimming frequency, so that the integral unit can return the result of the integral transform to zero based on the integral reference voltage.

According to another aspect of the present disclosure, a light source driver circuit is provided, comprising:

a plurality of light bars;

said single-string over power protection device, which is connected to a voltage acquisition unit of each light bar so as to detect the voltage thereof and output a locked standby signal based on the voltage value;

a boost converter and a driver IC, connected to the input terminal of the light bar to provide a driving voltage for the light bar and determine whether to enter into a standby state by means of the locked standby signal sent by the over power protection device.

Other features and advantages of the present disclosure will be illustrated and partially become clear in the following description, or will be understood through implementing the present disclosure. The objectives and other advantages of the present disclosure can be achieved and obtained based on the structures specified in the description, claims, and accompanying drawings.

BRIEF DESCRIPTION OF THE DRAWINGS

The accompanying drawings, which constitute a part of the description, are provided to further understand the present disclosure and to explain the present disclosure in conjunction with the embodiments. They should not to be construed as limitation to the present disclosure. In the accompanying drawings:

FIGS. 1a and 1b schematically shows a circuit of a light emitting diode light bar in the prior art;

DETAILED DESCRIPTION OF THE EMBODIMENTS

The present disclosure will be illustrated in detail below in conjunction with the embodiments and accompanying drawings, so as to reach the objectives of understanding the technical means of the present disclosure for solving the technical problems thereof and the process of achieving the technical effects thereof. It should be noted that, as long as there is no conflict, all of the technical features of the present disclosure can be combined with each other in any manner, and the technical solutions formed therefrom all fall within the scope of the present disclosure.

Figure 2:
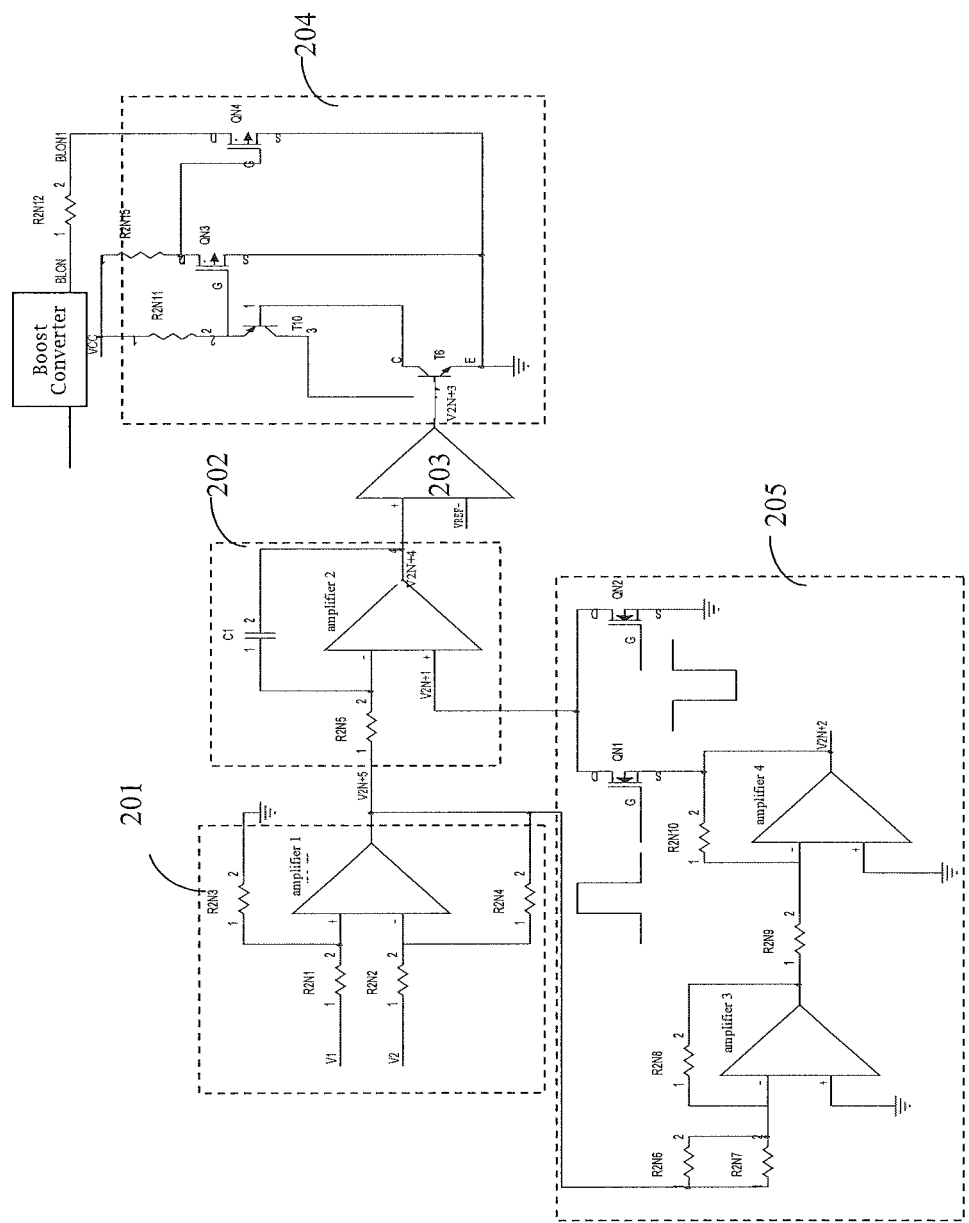
FIG. 2 is a schematic diagram of an over power protection circuit of a single-string light bar according to an embodiment of the present disclosure.

FIG. 2 schematically shows a circuit diagram of a single-string light bar over power protection device according to an embodiment of the present disclosure. The over power protection device includes a voltage detection unit 201, an integral unit 202, a comparison unit 203, and a latch unit 204.

The input terminal of the voltage detection unit 201 is connected to a resistor (shown as R1 . . . R2N+1 in FIG. 1a or FIG. 1b) at both terminals which is in series connection in the circuit of the single-string light bar, so as to obtain the terminal voltage V1−V2 across the resistor. Under the condition that the resistance of R1 . . . R2N+1 is given, the current flowing through the single-string light bar circuit can be measured.

According to an embodiment of the present disclosure, the voltage detection unit 201 includes a subtraction circuit being consisted of an amplifier and corresponding resistors. Resistors having the same value of resistance are arranged respectively at two differential input terminals and a feedback loop of the amplifier, i.e., R2N1=R2N2=R2N3=R2N4.

Figure 3:
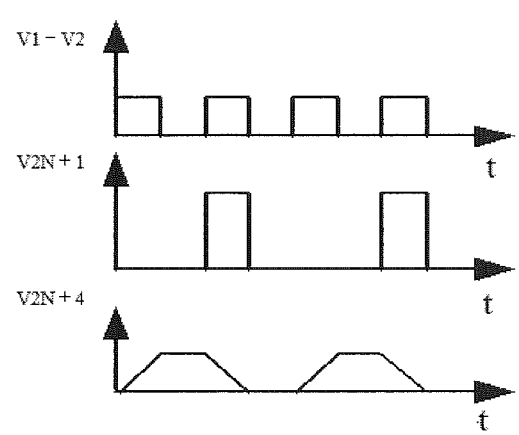
FIG. 3 is a sequence chart of the terminal voltage, integral reference voltage, and the integral voltage according to an embodiment of the present disclosure.

According to the op amp equation, the output V2N+5 of the amplifier 1 is V1−V2. In a circuit of a single-string light bar, the sequence chart of the terminal voltage V1−V2 is as shown in FIG. 3.

An input terminal of an integral unit 202 is connected to an output terminal of the voltage detection unit 201, so as to carry out an integral transform on the terminal voltage V1−V2 to obtain a voltage output V2N+4 after integral. As shown in FIG. 3, due to a capacitor in the feedback loop circuit, the output of the integral unit slowly rises to a certain value. Thus, beneficially, an integral unit is arranged for eliminating spikes in V1−V2, and avoiding mis-operations caused by direct overcurrent protection. For instance, even when there is abrupt change in the value of V1−V2 or the current in the circuit of the single-string light bar in a short time (such as 3D scanning, full bright, PWM dimming), no abrupt change occurs in the output of the integral unit 202. Therefore, the over power protection device is able to avoid mis-operations during, such as, 3D scanning.

According to an embodiment of the present disclosure, as shown in FIG. 2, the integral unit 202 is a differential input type. The other input of the integral unit 202 is connected to an integral reference voltage generation unit 205, so as to conduct a periodic integral transform on the terminal voltage V1−V2 based on an integral reference voltage V2N+1. The integral reference voltage generation unit 205 comprises a proportion amplifier unit 205a which is used to proportionally amplify the of the obtained terminal voltage.

A first switch QN1 and a second switch QN2 are connected to the output terminals of the proportion amplifier unit 205a, wherein one terminal of QN1 is connected to the output terminal of the proportion amplifier unit 205a to receive an amplified voltage signal V2N+2, and one terminal of QN2 is connected to the ground, while the other terminals of QN1 and QN2 are jointly connected with the integral unit 202. QN1 is kept at different on-off state from QN2 within the same time period. In other word, at the same time period, only one of QN1 and QN2 is on. FIG. 3 shows the wave form of the output integral reference voltage V2N+1.

Both QN1 and QN2 are MOSFET. Pulse sequences with the same frequency but reversed high-low levels are input to the control terminals of the first switch element QN1 and the second switch element QN2. Here, the frequency of the pulse sequences is related to the diming frequency.

As shown in FIG. 2, the proportion amplifier unit 205a is configured to double the input terminal voltage, i.e., V2N+2=2(V1−V2). In order to return the integral of the terminal voltage V2N+4 to zero within 2 cycles, the frequency of the pulse sequences input to the control terminals of QN1 and QN2 is configured to be the same with the dimming frequency. However, the present disclosure is not limited to this, the amplification factor of the proportion amplifier unit 205a can be different according to practical applications. Accordingly, the frequency of the pulse sequences input to the control terminals of QN1 and QN2 can be equal or related to the dimming frequency.

By doing this, the result of integral will not exceed the reference voltage $V_{ref}$ set by the system.

Referring to FIG. 2 again, the comparison unit 203 is connected to the output terminal of the integral unit 202 in order to compare the voltage after the integral transform with the reference voltage $V_{ref}$ set by the system parameters, and then output an effective over voltage signal when the voltage after the integral transform is higher than the reference voltage $V_{ref}$. The effective over voltage signal, signified by V2N+3 in FIG. 2, when being at high level, for example, shows that the current flowing through the single string light bar exceeds the rated value.

In this case, the latch unit 204, which is connected to the comparison unit 203, will lock the output standby signal according to the effective over voltage signal V2N+3. During the operating cycle, once the effective over voltage signal appears, such as a signal V2N+3 at high level, the latch unit 204 will maintain the standby signal BLON1 all the way until after a restart.

According to an embodiment of the present disclosure, as shown in FIG. 2, the latch unit 204 comprises a first transistor T6 and a second transistor T10. The first transistor is a NPN type, and the second is a PNP type. The base of the first transistor T6 is connected to both the output terminal of the comparison unit 203 and the collector of the second transistor T10. The collector of the first transistor T6 is connected to the base of the second transistor T10. The emitter of the second transistor T10 is connected to the power Vcc terminal via a pull-up resistor R2N11.

The latch unit 204 further comprises a third switch element QN3 and a fourth switch element QN4. The control terminal of the third switch element QN3 is connected to the emitter of the second transistor T10 so that the on-off state of the third switch element QN3 is controlled by the signal from the emitter of the second transistor T10. The two output terminals of the third switch element QN3 are respectively connected to the ground and to the power Vcc terminal. And the control terminal of the fourth switch element QN4 is connected to the output terminal of the third switch element QN3 which is connected to the power Vcc terminal. The output terminals of the fourth switch element QN4 are respectively connected to the enabled terminal of the boost converter and the ground. The boost converter settles into a standby state when the signal BLON1 from the enabled terminal is at low level, and it settles into a normal working state when the signal BLON1 on the enabled terminal is at high level.

Figure 4:
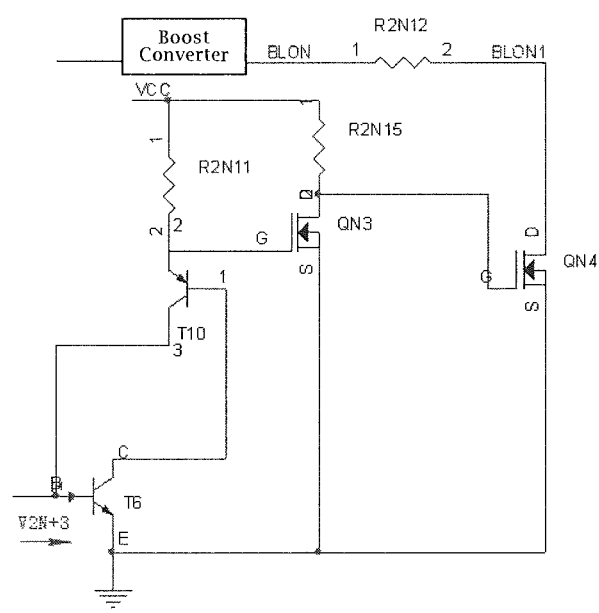
FIG. 4 is a schematic diagram of the latch unit in the over power protection circuit according to an embodiment of the present disclosure.

Specifically, as shown in FIG. 4, the third switch element QN3 and the fourth switch element QN4 are both MOSFET. When V2N+3 is at high level (i.e., when the integral transform value V2N+4 of V1−V2 exceeds $V_{ref}$), the transistors T6 and T10 are both on, a gate voltage across QN3 is clamped at low level by a lock-up circuit, therefore, according to the characteristics of an enhancement device, when the switch QN3 is kept off and QN4 is kept on, the BLON1 signal is at low level. The BLON1 signal is sent to the enabled terminal of the boost converter to keep it at the standby state.

However, once the value of V1−V2 exceeds the reference voltage, the lock-up circuit comprising T6 and T10 will lock the output of the comparison unit 203 at an effective over voltage, even after the integral value V2N+4 of V1−V2 reverts to lower than the reference voltage, the lock-up circuit will continue to keep the BLON1 at low level. Only until after the restart can the boost converter work normally. In this way, the over power protection device can provide stable protection for the LED light bar.

According to another aspect of the present disclosure, a light source driver circuit is provided, comprising:
a number of light bars;
aforesaid single-string over power protection device, which is connected to a voltage acquisition unit of each light bar so as to detect the voltage across the voltage acquisition unit and output the locked standby signal;
a boost converter and a driver IC, connected to the input terminal of the light bar to provide a driving voltage for the light bar and determine whether to enter into the standby state by means of the locked standby signal sent by the over power protection device.

The foregoing embodiments are provided only to better understand the present disclosure, they should not be construed as limitation to the scope of the present disclosure. Any changes or modifications within the scope disclosed in the present disclosure can be made to the implementing form or specifics of the present disclosure by any one skilled in the art. However, the scope of the present disclosure should be subjected to the claims.

What is claimed is:

1. A single-string over power protection device for a display, comprising:
   a voltage detection unit, with an input terminal being connected to a voltage acquisition component in the circuit of a single-string light bar at both ends, for obtaining the voltage across the voltage acquisition component;
   an integral unit, with an input terminal being connected to the output terminal of the voltage detection unit, for performing an integral transform on the voltage obtained;
   a comparison unit, which is connected to the output terminal of the integral unit, for comparing the voltage after the integral transform with a reference voltage determined by system parameters, so as to output an effective over voltage signal when the voltage after the integral transform is higher than the reference voltage; and
   a latch unit, connected to the comparison unit to lock an output standby signal according to the effective over voltage signal,
   wherein the latch unit comprises a first transistor and a second transistor, a base of the first transistor is connected to both the output terminal of the comparison unit and the collector of the second transistor, the collector of the first transistor is connected to a base of the second transistor, and an emitter of the second transistor is connected to a power Vcc terminal via a pull-up resistor.

2. The device according to claim 1, wherein the integral unit is a differential input type integral unit, with another input terminal thereof being connected to an integral reference voltage generation unit to conduct an integral transform on the terminal voltage on the basis of an integral reference voltage, and
   the integral reference voltage generation unit includes a proportion amplifier unit for proportionally amplifying the terminal voltage.

3. The device according to claim 2, wherein a first switch element and a second switch element are further connected to an output terminal of the proportion amplifier unit, and
   the first switch element is kept at a different on-off state from the second switch element within the same time period.

4. The device according to claim 3, wherein both the first switch element and the second switch element are MOSFET, and pulse sequences with the same frequency but reversed high-low levels are respectively input to the control terminals of the two switch elements.

5. The device according to claim 4, wherein the frequency of the pulse sequences is related to a dimming frequency.

6. The device according to claims 1, wherein the first transistor of the latch unit is a NPN type transistor and the second transistor of the latch unit is a PNP type transistor.

7. The device according to claim 6, wherein the latch unit further comprises a third switch element and a fourth switch element, in which a control terminal of the third switch element is connected to the emitter of the second transistor, so as to control on-off state of the third switch element by a signal on the emitter of the second transistor, two output terminals of the third switch element are respectively connected to a ground and the power Vcc terminal, the control terminal of the fourth switch element is connected to the input terminal of the third switch element which is connected to the power Vcc terminal, and the output terminals of the fourth switch element are respectively connected to an enabled terminal of a boost converter and the ground, and the boost converter settles into a standby state when the signal input to the enabled terminal is at low level, and it settles into a normal working state when the signal input to the enabled terminal is at high level.

8. The device according to claim 5, wherein the proportion amplifier unit is configured to double the input terminal voltage, and the frequency of the pulse sequence is equal to the dimming frequency, so that the integral unit can return a result of the integral transform to zero based on the integral reference voltage.

9. The device according to claim 6, wherein during an operating cycle, once an effective over voltage signal appears, the latch unit will keep the standby signal after experiencing a restart.

10. A light source driver circuit in a display, comprising:
a number of light bars;
a single-string over power protection device, which is connected to a voltage acquisition unit of each light bar so as to detect the voltage thereof, and output a locked standby signal based on the voltage detected, wherein the single-string over power protection device comprises:
a voltage detection unit, with an input terminal being connected to a voltage acquisition component in the circuit of a single-string light bar at both ends, for obtaining the voltage across the voltage acquisition component,
an integral unit, with an input terminal being connected to the output terminal of the voltage detection unit, for performing an integral transform on the voltage obtained,
a comparison unit, which is connected to the output terminal of the integral unit, for comparing the voltage after the integral transform with a reference voltage determined by the system parameters, so as to output an effective over voltage signal when the voltage after the integral transform is higher than the reference voltage, and
a latch unit connected to the comparison unit to lock the output standby signal according to the effective over voltage signal, wherein the latch unit comprises a first transistor and a second transistor, a base of the first transistor is connected to both the output terminal of the comparison unit and the collector of the second transistor, the collector of the first transistor is connected to a base of the second transistor, and an emitter of the second transistor is connected to a power Vcc terminal via a pull-up resistor; and a boost converter and a driver IC, connected to the input terminal of the light bar to provide a driving voltage for the light bar, and determine whether to enter into a standby state by means of the locked standby signal sent by the over power protection device.

11. The circuit according to claim 10, wherein the integral unit is a differential input type integral unit, with another input thereof being connected to the reference voltage generation unit to conduct an integral transform on the terminal voltage and on the basis of an integral reference voltage, and the integral reference voltage generation unit includes a proportion amplifier unit for proportionally amplifying the terminal voltage.

12. The circuit according to claim 11, wherein a first switch element and a second switch element are further connected to an output terminal of the proportion amplifier unit, and the first switch element is kept at a different on-off state from the second switch element within the same time period.

13. The circuit according to claim 12, wherein the first switch element and the second switch element are MOSFET, and pulse sequences with the same frequency but reversed high-low levels are respectively input to the control terminals of the two switch elements.

14. The circuit according to claim 13, wherein the frequency of the pulse sequences is related to a dimming frequency.

15. The circuit according to claim 14, wherein the proportion amplifier unit is configured to double the input terminal voltage, and the frequency of the pulse sequence is equal to the dimming frequency, so that the integral unit can return a result of the integral transform to zero based on the integral reference voltage.

16. The circuit according to claim 10, wherein the first transistor of the latch unit is a NPN type transistor and the second transistor of the latch unit is a PNP type transistor.

17. The circuit according to claim 16, wherein the latch unit further comprises a third switch element and a fourth switch element, a control terminal of the third switch element is connected to the emitter of the second transistor, so as to control the on-off state of the third switch element by a signal on the emitter of the second transistor, two output terminals of the third switch element are respectively connected to a ground and the power Vcc terminal, the control terminal of the fourth switch element is connected to the input terminal of the third switch element which is connected to the power Vcc terminal, and the output terminals of the fourth switch element are respectively connected to an enabled terminal of a boost converter and the ground, and the boost converter settles into a standby state when the signal input to the enabled terminal is at low level, and it settles into a normal working state when the signal input to the enabled terminal is at high level.

18. The circuit according to claim 15, wherein during an operating cycle, once an effective over voltage signal appears, the latch unit will keep the standby signal until after experiencing a restart.

* * * * *